United States Patent
Pauer

(10) Patent No.: US 6,425,288 B1
(45) Date of Patent: Jul. 30, 2002

(54) LEVER TRANSMITTER FOR DETERMINING A FILLING LEVEL OF LIQUID IN A TANK

(75) Inventor: Bernd Pauer, Eppstein (DE)

(73) Assignee: Mannesmann VDO AG (DE)

( * ) Notice: Subject to any disclaimer, the term of this patent is extended or adjusted under 35 U.S.C. 154(b) by 0 days.

(21) Appl. No.: 09/435,179

(22) Filed: Nov. 5, 1999

(51) Int. Cl.⁷ .............................. G01F 23/26; H01L 10/48
(52) U.S. Cl. .............................. 73/305; 73/313; 73/317; 340/625; 338/190; 338/202
(58) Field of Search ........................ 73/305, 313, 314, 73/317, 322.5; 340/625, 624, 623; 338/90, 92, 190, 202

(56) References Cited

U.S. PATENT DOCUMENTS

| | | | | |
|---|---|---|---|---|
| 1,154,162 A | * | 9/1915 | Baker | 73/313 |
| 2,266,298 A | * | 12/1941 | Bacon | 73/317 |
| 3,200,646 A | * | 8/1965 | Donko et al. | 73/317 |
| 4,557,144 A | * | 12/1985 | Lucchini | 73/313 |
| 4,870,861 A | * | 10/1989 | Ohtani et al. | 73/317 |
| 4,924,704 A | * | 5/1990 | Gaston | 73/317 |
| 5,140,303 A | * | 8/1992 | Meyer | 73/305 |
| 5,746,088 A | * | 5/1998 | Sawert et al. | 73/313 |
| 5,765,435 A | * | 6/1998 | Grotschel et al. | 73/313 |
| 6,021,668 A | * | 2/2000 | Sawert et al. | 73/313 |
| 6,127,916 A | * | 10/2000 | Cooper et al. | 73/317 |

FOREIGN PATENT DOCUMENTS

| | | | | |
|---|---|---|---|---|
| DE | 33 30 871 A1 | | 8/1983 | ........... G01F/23/10 |
| GB | 2048495 A | * | 4/1980 | ................... 73/313 |

* cited by examiner

Primary Examiner—Hezron Williams
Assistant Examiner—Michael Cygan
(74) Attorney, Agent, or Firm—Richard A. Speer; Mayer, Brown, Rowe & Maw

(57) ABSTRACT

In a lever transmitter for a fuel tank, two spring tongues, each with a sliding contact, are arranged on a contact plate of a potentiometer. The contact plate is prestressed against sliding tracks of the potentiometer by a spring element fastened to the carrier and having the sliding contacts due to vibrations are thereby reliably avoided.

7 Claims, 1 Drawing Sheet

LEVER TRANSMITTER FOR DETERMINING A FILLING LEVEL OF LIQUID IN A TANK

BACKGROUND OF THE INVENTION

1. Field of the Invention

The present invention relates to a lever transmitter for determining a filling level of liquid in a tank, with a lever arm pivotally mounted on a carrier and carrying a float and with a potentiometer for generating electric signals as a function of the pivot angle of the lever arm. The potentiometer has two sliding tracks arranged on the carrier and a contact plate arranged on the lever arm and is prestressed in the direction of the sliding tracks by means of a spring element, said contact plate having two sliding contacts connected electrically to one another and bearing on the sliding tracks.

2. Description of the Related Art

Such lever transmitters are used, in particular, for determining a filling level of fuel in a fuel tank of a motor vehicle and are known in practice. Since two sliding tracks are arranged on the carrier, there is no need for electric leads to be fastened to the lever arm. This makes the lever transmitter particularly cost-effective. In the known lever transmitter, the contact plate is of angular design, a first leg carrying the two sliding contacts and the second leg being guided in the lever arm. The spring element is designed as a leaf spring and bears on that side of the first leg of the contact plate which faces away from the sliding contacts.

A disadvantage of the known lever transmitter is that vibrations and bending forces acting on the lever arm may cause the sliding contacts to lift off briefly from the sliding tracks. Furthermore, tolerances in the height of the sliding tracks lead to the leaf spring exerting varying prestress on the sliding contacts.

SUMMARY OF THE INVENTION

The problem on which the invention is based is to design the lever transmitter of the type initially mentioned, in such a way that the sliding contacts are prestressed against the sliding tracks with as constant a force as possible.

This problem is solved, according to the invention, in that the sliding contacts are moveable relative to the contact plate in the direction of the sliding tracks.

By virtue of this design, the sliding contacts are no longer fastened rigidly to the contact plate. Tilting movements and varying prestresses of the sliding contacts are compensated by their moveability.

Consequently, tolerances in the height of the sliding tracks or bending forces acting on the lever arm do not cause the sliding contacts to lift off. Moreover, the prestressing force of the spring element is distributed largely uniformly to the two sliding contacts. In the event of vibrations, therefore, a constantly reliable force prestressing the sliding contacts against the sliding tracks is likewise ensured. The risk that the sliding contacts will lift off is markedly reduced by virtue of the invention.

According to an advantageous development of the invention, the moveability of the sliding contacts can be achieved at particularly low outlay in terms of construction if a further spring element is arranged between the contact plate and the two sliding contacts. The prestress on the sliding contacts is thereby generated by springs arranged one behind the other. Tests showed that, when fuel supply transmitters were subjected to random vibration, markedly fewer contact interruptions, particularly in the range of between 0.1 and 0.5 ms, occurred. Longer contact interruptions of more than 1 ms due to liftoffs of the sliding contacts no longer occurred at all. The lever transmitter according to the invention is therefore reliably protected against liftoffs, particularly in the case of vibrations often occurring in motor vehicles.

According to another advantageous development of the invention, the contact plate and the sliding contacts are designed particularly simply in terms of construction if the sliding contacts are arranged in each case on spring tongues.

According to another advantageous development of the invention, in the case of bending forces acting on the lever wire, it is possible in a simple way to ensure that the two sliding contacts are pressed against the sliding tracks, if the sliding contacts are arranged on ends of a crossbar and if the crossbar is connected centrally, via a bending spring, to a guide region of the contact plate. In this case, the prestress on the sliding contacts is more uniform, the lower the spring constant of the bending spring is.

Plastic deformation of the resilient arms or of the bending springs due to high bending forces can be avoided in a simple way if the contact plate has stops for limiting the range of movement of the sliding contacts.

BRIEF DESCRIPTION OF THE DRAWINGS

The invention permits numerous embodiments. In order to make its basic principle even clearer, two of these are illustrated in the drawing and are described below. In the drawing.

DETAILED DESCRIPTION OF THE EMBODIMENTS

Figure 1:
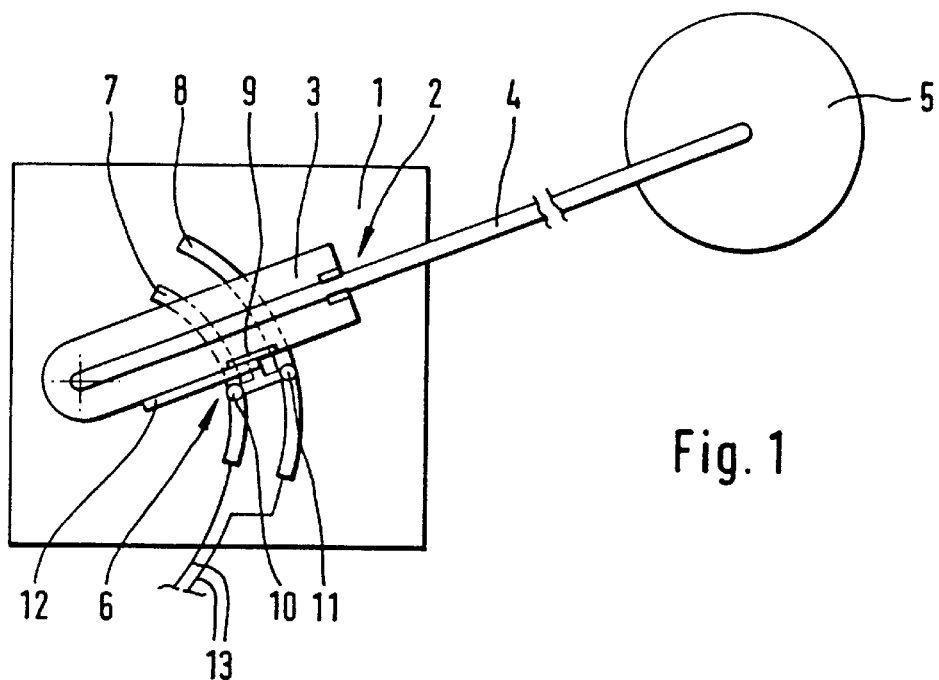
FIG. 1 shows a diagrammatic illustration of a lever transmitter according to the invention.

FIG. 1 shows a lever transmitter with a lever arm 2 pivotally mounted on a carrier part 1. The lever arm 2 has a plastic clip 3 and a lever wire 4 fastened to the latter. A float 5 is fastened to the free end of the lever wire 4. The lever transmitter may, for example, be mounted, together with the carrier part 1, on a wall, not illustrated, of a fuel tank of a motor vehicle. In this case, the float 5 follows the fuel level and pivots the lever arm 2. The pivot angle of the lever arm 2 is detected by a potentiometer 6 and converted into electric signals. The potentiometer 6 has two sliding tracks 7, 8 arranged on the carrier part 1 and a contact plate 9 with two sliding contacts 10, 11. The sliding contacts 10, 11 are prestressed by a tongue-shaped spring element 12 against the sliding tracks 7, 8 and form an electrically conducted bridge of the two sliding tracks 7, 8. All the electric leads 13 necessary for connecting the potentiometer 6 are consequently arranged on the carrier part 1.

Figure 2:
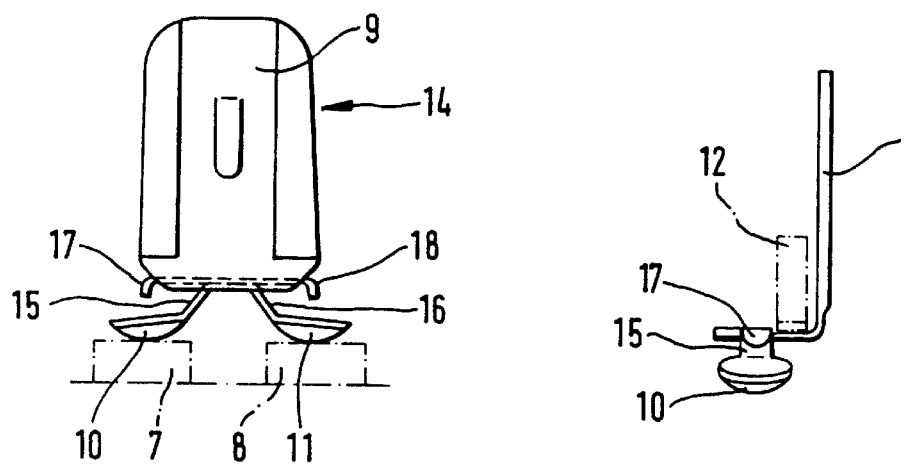
FIG. 2 shows a contact plate of the lever transmitter from FIG. 1 in three greatly enlarged views.

The contact plate 9 from FIG. 1 is illustrated, greatly enlarged, in FIG. 2. The contact plate 9 has a guide region 14, by means of which it is guided axially displaceably in the plastic clip 3 illustrated in FIG. 1. The sliding contacts 10, 11 are in each case arranged on spring tongues 15, 16 and have a rivet shaped design. The sliding contacts 10, 11 are held by the spring tongues 15, 16 so as to be moveable in the direction of the sliding tracks 7,8 from FIG. 1 which are illustrated by dashed and dotted lines. Furthermore, the contact plate 9 has stops 17, 18 limiting the pivoting range of the sliding contacts 10, 11. Plastic deformation of the spring tongues 15, 16 is thereby prevented.

Figure 3:
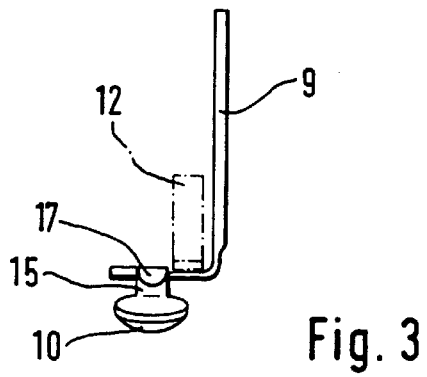
FIG. 3 shows. a contact plate of the lever transmitter from FIG. 1 in three greatly enlarged views.

FIG. 3 shows the contact plate 9 from FIG. 2 in a view from the left. It can be seen, here, that the stops 17, 18 are formed by angled strips of the contact plate 9. For the sake of clarity, the tongue-shaped spring element 12 from FIG. 1 is illustrated by dashed and dotted lines in FIG. 3. It can be seen clearly, here, that the spring tongues 15, 16 and the tongue shaped spring element 12 are arranged one behind the other.

Figure 4:
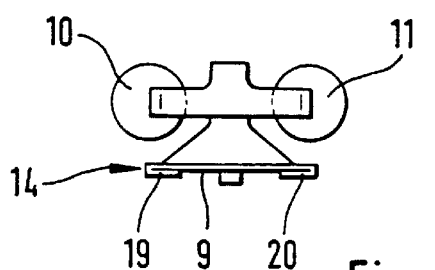
FIG. 4 shows a contact plate of the lever transmitter from FIG. 1 in three greatly enlarged views.

FIG. 4 shows a top view of the contact plate 9 from FIG. 2. The guide region 14 is reinforced on both sides by crimped portions 19, 20.

Figure 5:
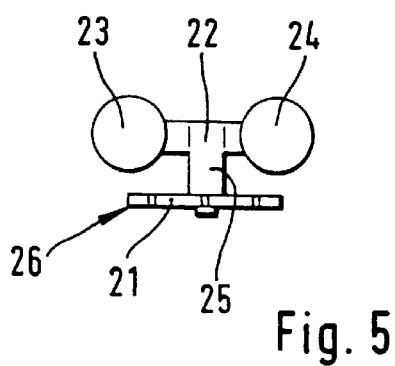
FIG. 5 shows a top view of a further embodiment of a contact plate.

FIG. 5 shows a further embodiment of a contact plate 21 for the potentiometer 6 from FIG. 1, with two sliding contacts 23, 24 arranged on a crossbar 22. The crossbar 22 is fastened centrally, via a bending spring 25, to a guide region 26 of the contact plate 21. The bending spring 25 makes it possible to equalize the height of the sliding contacts 23, 24.

I claim:

1. A lever transmitter for determining a filling level of liquid in a tank comprising: a lever arm pivotally mounted on a carrier attached to a float; a potentiometer having two sliding tracks arranged on the carrier and a contact plate arranged on the lever arm prestressed in a direction of the sliding tracks by means of a spring element; said contact plate having a support arm for first and second contact members, wherein the contact members are connected to the support arm via respective spring members which extend in opposite directions from the support arm.

2. The lever transmitter as claimed in claim 1, wherein at least one further spring element is arranged between the contact plate and the two sliding contacts.

3. The lever transmitter as claimed in claim 1, wherein the sliding contacts are arranged in each case on spring tongues.

4. The lever transmitter as claimed in claim 1, wherein a further spring element is a bending spring.

5. The lever transmitter of claim 1 wherein the support arm is prestressed in a direction of the resistor tracks by a second spring element.

6. The lever transmitter as claimed in claim 1, wherein the contact plate has stops that limit a range of movement of the sliding contacts.

7. The lever transmitter of claim 6, wherein the stop members prevent motion in a direction perpendicular to the resistor tracks.

\* \* \* \* \*